(12) United States Patent
McCaffrey et al.

(10) Patent No.: US 11,230,940 B1
(45) Date of Patent: Jan. 25, 2022

(54) CONTROLLED CONTACT SURFACE FOR A SECONDARY SEAL IN A NON-CONTACT SEAL ASSEMBLY

(71) Applicant: Raytheon Technologies Corporation, Farmington, CT (US)

(72) Inventors: Michael G. McCaffrey, Windsor, CT (US); Joseph D. Evetts, Glastonbury, CT (US); Kristine M. Carnavos, Glastonbury, CT (US); Conway Chuong, Manchester, CT (US); Christopher W. Robak, Manchester, CT (US); William Proscia, Marlborough, CT (US); Purity Dele-Oni, East Hartford, CT (US); Caroline Karanian, West Hartford, CT (US); John E. Paul, Portland, CT (US); Jagannath Pranatharthikaran, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/006,983

(22) Filed: Aug. 31, 2020

(51) Int. Cl.
*F01D 11/02* (2006.01)
*F01D 11/08* (2006.01)

(52) U.S. Cl.
CPC ............ *F01D 11/025* (2013.01); *F01D 11/08* (2013.01); *F05D 2240/11* (2013.01); *F05D 2240/55* (2013.01); *F05D 2250/141* (2013.01); *F05D 2250/37* (2013.01)

(58) Field of Classification Search
CPC .... F01D 11/08; F01D 11/025; F05D 2240/11; F05D 2240/55; F05D 2250/141; F05D 2250/37
See application file for complete search history.

(56) References Cited

U.S. PATENT DOCUMENTS

| | | | |
|---|---|---|---|
| 4,998,739 A | 3/1991 | Weiler | |
| 6,226,975 B1 | 5/2001 | Ingistov | |
| 7,726,660 B2 | 6/2010 | Datta | |
| 8,172,232 B2 | 5/2012 | Justak | |
| 8,919,781 B2 | 12/2014 | Justak | |

(Continued)

FOREIGN PATENT DOCUMENTS

| | | |
|---|---|---|
| CA | 2536362 C | 2/2013 |
| WO | 2008094761 A1 | 8/2008 |
| WO | 2016179608 A2 | 11/2016 |

*Primary Examiner* — Igor Kershteyn
(74) *Attorney, Agent, or Firm* — Getz Balich LLC

(57) ABSTRACT

A rotational equipment assembly includes a plurality of seal shoes, a seal base, a plurality of spring elements and a secondary seal assembly. The seal shoes are arranged circumferentially around an axial centerline and include a first seal shoe. The first seal shoe includes a first seal shoe base and a first seal shoe rib that projects axially out from the first seal shoe base to an axial distal end of the first seal shoe rib. The seal base extends circumferentially around the axial centerline. The spring elements include a first spring element that connects and extends between the first seal shoe and the seal base. The secondary seal assembly is configured to seal a gap between the seal base and the seal shoes. The secondary seal assembly includes a free floating seal plate that axially contacts and is configured to slide radially along the first seal shoe rib.

20 Claims, 14 Drawing Sheets

(56) References Cited

U.S. PATENT DOCUMENTS

| | | | |
|---|---|---|---|
| 9,115,810 B2 | 8/2015 | Bidkar | |
| 9,145,785 B2 | 9/2015 | Bidkar | |
| 9,359,908 B2 | 6/2016 | Bidkar | |
| 10,082,039 B2 | 9/2018 | Hanson | |
| 10,190,431 B2 | 1/2019 | Bidkar | |
| 2011/0121519 A1* | 5/2011 | Justak | F01D 11/025 277/412 |
| 2013/0259660 A1 | 10/2013 | Dale | |
| 2014/0008871 A1 | 1/2014 | Bidkar | |
| 2014/0050564 A1 | 2/2014 | Hagan | |
| 2014/0062024 A1 | 3/2014 | Bidkar | |
| 2014/0119912 A1 | 5/2014 | Bidkar | |
| 2016/0010480 A1 | 1/2016 | Bidkar | |
| 2016/0069269 A1* | 3/2016 | Hyland | F01D 25/22 415/1 |
| 2016/0102570 A1 | 4/2016 | Wilson | |
| 2016/0109025 A1 | 4/2016 | McCaffrey | |
| 2016/0115804 A1 | 4/2016 | Wilson | |
| 2016/0115805 A1 | 4/2016 | Gibson | |
| 2016/0130963 A1 | 5/2016 | Wilson | |
| 2017/0211402 A1* | 7/2017 | Peters | F01D 11/025 |
| 2017/0306780 A1 | 10/2017 | Peters | |
| 2018/0045067 A1* | 2/2018 | Chuong | F01D 5/02 |
| 2018/0058237 A1* | 3/2018 | Wilson | F04D 29/321 |
| 2018/0372229 A1 | 12/2018 | Bidkar | |
| 2021/0062669 A1* | 3/2021 | Chuong | F01D 11/003 |

\* cited by examiner

CONTROLLED CONTACT SURFACE FOR A SECONDARY SEAL IN A NON-CONTACT SEAL ASSEMBLY

This invention was made with Government support awarded by the United States. The Government has certain rights in this invention.

BACKGROUND OF THE DISCLOSURE

1. Technical Field

This disclosure relates generally to rotational equipment and, more particularly, to a non-contact seal for rotational equipment.

2. Background Information

Rotational equipment typically includes one or more seal assemblies for sealing gaps between rotors and stators. A typical seal assembly includes a contact seal with a seal element such as a knife edge seal that engages a seal land. Such a contact seal can generate a significant quantity of heat that can reduce efficiency of the rotational equipment as well as subject other components of the rotational equipment to high temperatures and internal stresses. To accommodate these high temperatures and stresses, certain components of the rotational equipment may be constructed from specialty high temperature materials. However, these materials can significantly increase manufacturing and servicing costs as well as mass of the rotational equipment. While non-contact seals have been developed in an effort to reduce heat within rotational equipment, there is still room for improvement to provide an improved non-contact seal. In particular, there is room in the art for a non-contact seal with improved secondary sealing characteristics.

SUMMARY OF THE DISCLOSURE

According to an aspect of the present disclosure, an assembly is provided for rotational equipment. This rotational equipment assembly includes a plurality of seal shoes, a seal base, a plurality of spring elements and a secondary seal assembly. The seal shoes are arranged circumferentially around an axial centerline in an annular array. The seal shoes include a first seal shoe. The first seal shoe includes a first seal shoe base and a first seal shoe rib that projects axially out from the first seal shoe base to an axial distal end of the first seal shoe rib. The seal base extends circumferentially around the axial centerline. The spring elements include a first spring element. The first spring element connects and extends between the first seal shoe and the seal base. The secondary seal assembly is configured to seal a gap between the seal base and the seal shoes. The secondary seal assembly includes a free floating seal plate that axially contacts and is configured to slide radially along the first seal shoe rib.

According to another aspect of the present disclosure, another assembly is provided for rotational equipment. This rotational equipment assembly includes a plurality of seal shoes, a stationary support structure, a plurality of spring elements and a free floating seal plate. The seal shoes seal shoes are arranged circumferentially around an axial centerline in an annular array. The seal shoes include a first seal shoe. The stationary support structure extends circumferentially around the axial centerline. The stationary support structure includes a base and a rib that projects axially out from the base to an axial distal end of the rib. The spring elements include a first spring element. The first spring element connects and extends between the first seal shoe and the stationary support structure. The free floating seal plate is configured to seal a gap between the stationary support structure and the seal shoes. The free floating seal plate axially contacts and is configured to slide radially along the rib.

According to still another aspect of the present disclosure, another assembly is provided for rotational equipment. This rotational equipment assembly includes a plurality of seal shoes, a stationary support structure, a plurality of spring elements and a seal plate. The seal shoes are arranged circumferentially around an axial centerline in an annular array. The seal shoes include a first seal shoe. The stationary support structure extends circumferentially around the seal shoes. The spring elements includes a first spring element. The first spring element connects and extends between the first seal shoe and the stationary support structure. The seal plate is configured to seal a gap between the stationary support structure and the seal shoes. The seal plate is configured with an annular seal plate rib configured to axially contact and slide radially along one of the first seal shoe and the stationary support structure.

The stationary support structure may include a seal base and a support ring abutted axially against the seal base. The seal base may extend circumferentially around the seal shoes. The support ring may include the base and the rib.

The first seal shoe may include a first seal shoe base and a first seal shoe rib that projects axially out from the first seal shoe base to an axial distal end of the first seal shoe rib. The free floating seal plate may axially contact and may be configured to slide radially along the first seal shoe rib.

The free floating seal plate may include a split ring seal element.

The free floating seal plate may be configured as a monolithic, unitary body that extends at least substantially around the axial centerline.

The free floating seal plate may be configured as or otherwise include a first free floating seal plate. The secondary seal assembly may also include a second free floating seal plate stacked axially with the first free floating seal plate.

The free floating seal plate may have an axial thickness and a radial height. A ratio of the radial height to the axial thickness may be greater than 400:1 and/or less than 4000:1. The ratio, for example, may be between 400:1 to 4000:1.

The secondary seal assembly may also include a ring structure configured with an annular channel. The free floating seal plate may project, in a radially outward direction, into the annular channel and may be configured to freely float within the annular channel.

The free floating seal plate may not be constrained by any fasteners.

The free floating seal plate may not be constrained by any spring elements.

The secondary seal assembly may also include a support ring configured with a support ring base and a support ring rib that projects axially out from the support ring base to an axial distal end of the support ring rib. The free floating seal plate may axially contact and/or may be configured to slide radially along the support ring rib.

The secondary seal assembly may also include a retention ring. The support ring may be axially between the seal base and the retention ring. The free floating seal plate may be captured axially by and between the support ring and the retention ring.

The first seal shoe rib may be configured as or otherwise include an arcuate rib. The support ring rib may be configured as or otherwise include an annular rib.

The first seal shoe rib may be configured with a crowned surface at the axial distal end of the first seal shoe rib. The free floating seal plate may axially contact and/or may be configured to slide radially along the crowned surface.

The crowned surface may have a curved sectional geometry.

The crowned surface may have a pointed sectional geometry.

The first seal shoe rib may be configured with a flat planar surface at the axial distal end of the first seal shoe rib. The free floating seal plate may axially contact and may be configured to slide radially along the flat planar surface.

A channel may project axially into the first seal shoe. The channel may be located radially inboard of and radially bounded by the first seal shoe rib.

The first spring element may include a first mount, a second mount and a spring beam. The first mount may be connected to the first seal shoe. The second mount may be connected to the seal base. The spring beam may extend laterally between and may be connected to the first mount and the second mount.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
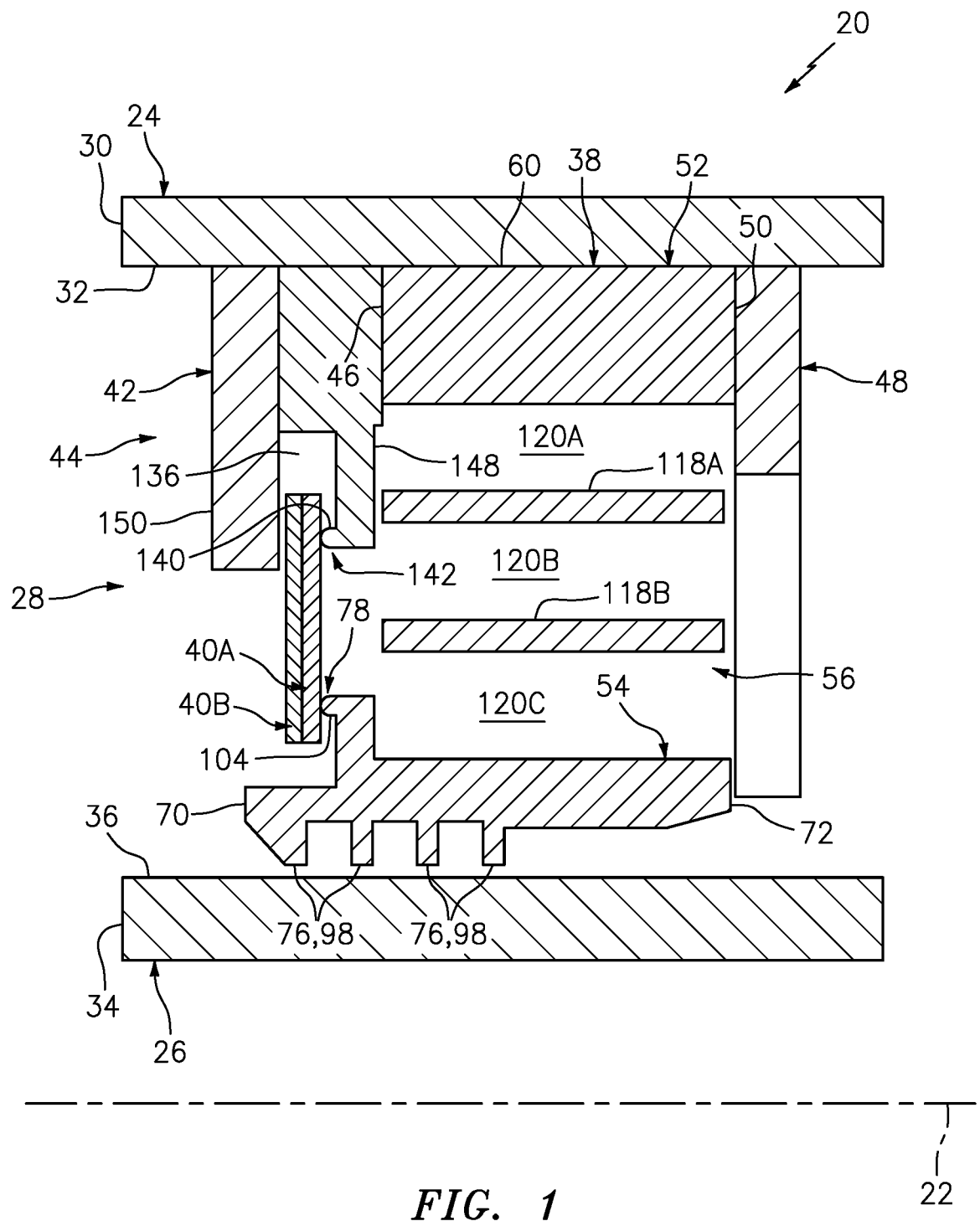
FIG. 1 is a partial side sectional illustration of an assembly for rotational equipment.

FIG. 1 illustrates an assembly 20 for rotational equipment with an axial centerline 22, which axial centerline 22 may also be an axis of rotation (e.g., a rotational axis) for one or more components of the rotational equipment assembly 20. An example of such rotational equipment is a gas turbine engine for an aircraft propulsion system, an exemplary embodiment of which is described below in further detail (e.g., see FIG. 17). However, the rotational equipment assembly 20 of the present disclosure is not limited to such an aircraft or gas turbine engine application. The rotational equipment assembly 20, for example, may alternatively be configured with rotational equipment such as an industrial gas turbine engine, a wind turbine, a water turbine or any other apparatus in which a seal is provided between a stationary structure and a rotating structure; e.g., a rotor.

The rotational equipment assembly 20 of FIG. 1 includes a stationary structure 24, a rotating structure 26 and a seal assembly 28 such as, for example, a non-contact seal assembly. The seal assembly 28 is mounted with the stationary structure 24 and configured to substantially seal an annular gap between the stationary structure 24 and the rotating structure 26 as described below in further detail.

The stationary structure 24 includes a seal carrier 30. This seal carrier 30 may be a discrete, unitary annular body. Alternatively, the seal carrier 30 may be configured with another component/portion of the stationary structure 24. The seal carrier 30 has a seal carrier inner surface 32. This seal carrier inner surface 32 may be substantially cylindrical. The seal carrier inner surface 32 extends circumferentially about (e.g., completely around) and faces towards the axial centerline 22. The seal carrier inner surface 32 at least partially forms a bore in the stationary structure 24. This bore is sized to receive the seal assembly 28, which seal assembly 28 may be fixedly attached to the seal carrier 30 by, for example, a press fit connection between the seal assembly 28 and the seal carrier inner surface 32. The seal assembly 28, of course, may also or alternatively be fixedly attached to the seal carrier 30 using one or more other techniques/devices.

The rotating structure 26 includes a rotating seal land 34. This rotating seal land 34 may be a discrete, unitary annular body. For example, the rotating seal land 34 may be mounted to a shaft of the rotating structure 26. Alternatively, the rotating seal land 34 may be configured with another component/portion of the rotating structure 26. For example, the rotating seal land 34 may be an integral part of a shaft of the rotating structure 26, or another component mounted to the shaft.

The rotating seal land 34 of FIG. 1 has an outer seal land surface 36. This outer seal land surface 36 may be substantially cylindrical. The outer seal land surface 36 extends circumferentially about (e.g., completely around) and faces away from the axial centerline 22. The outer seal land surface 36 is configured to face towards and may be axially aligned with the seal carrier inner surface 32. While FIG. 1 illustrates the outer seal land surface 36 and the seal carrier inner surface 32 with approximately equal axial lengths along the axial centerline 22, the outer seal land surface 36 may alternatively be longer or shorter than the seal carrier inner surface 32 in other embodiments.

The seal assembly 28 includes a primary seal device 38 and one or more secondary seal devices 40A and 40B (generally referred to as "40"); e.g., free floating seal plates. The seal assembly 28 also includes one or more additional components for positioning, supporting and/or mounting one or more of the seal devices 38 and 40 with the stationary structure 24. The seal assembly 28 of FIG. 1, for example, includes a first ring structure 42 configured for positioning, supporting and/or mounting the secondary seal devices 40 relative to the primary seal device 38. The one or more secondary seal devices 40 and the first ring structure 42 may collectively provide a secondary seal assembly 44. The first ring structure 42 may also be configured for axially positioning and/or supporting an axial first side surface 46 of the primary seal device 38 relative to the stationary structure 24.

Figure 2:
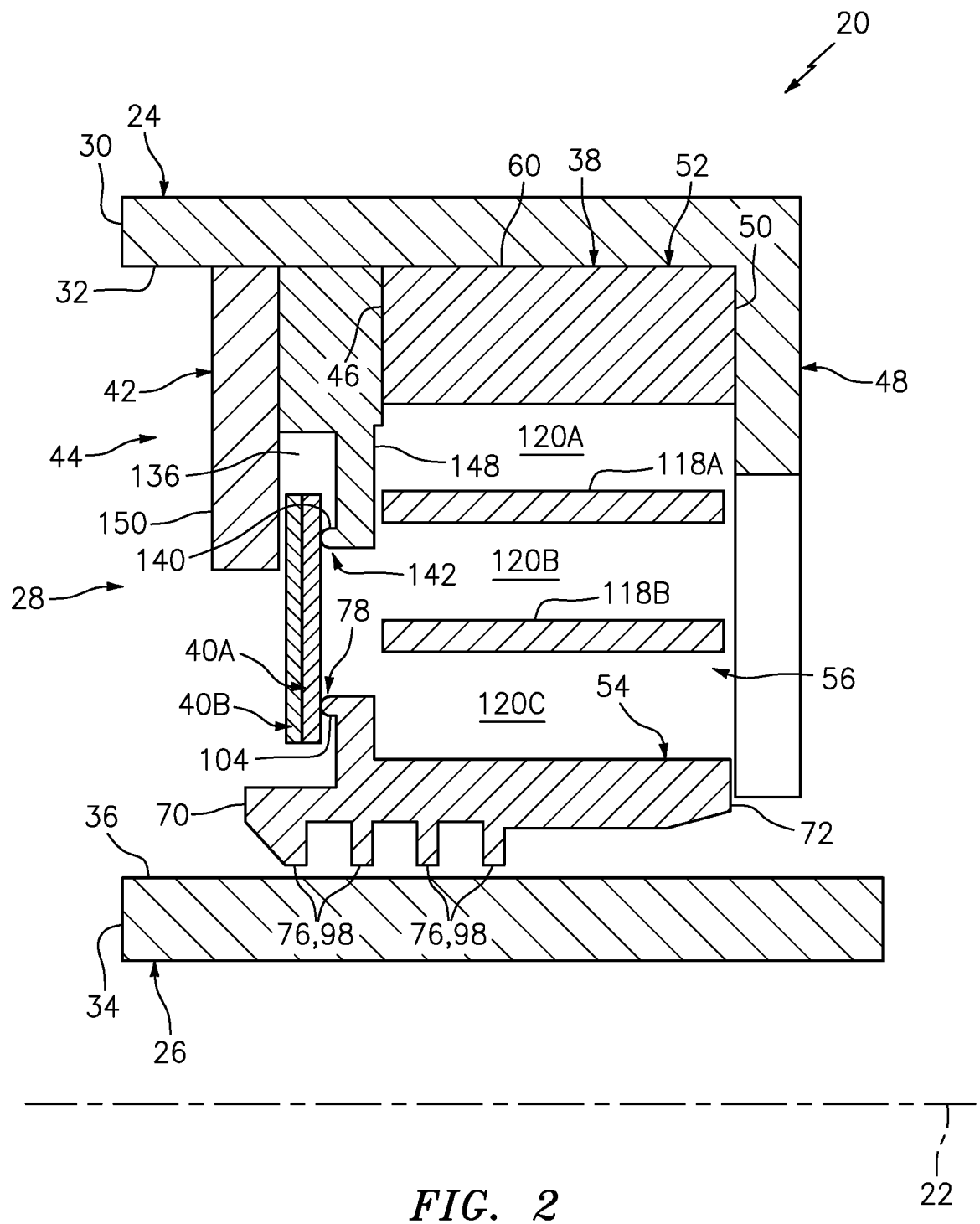
FIG. 2 is a partial side sectional illustration of the assembly configured with another stationary structure.

The seal assembly 28 of FIG. 1 also includes a second ring structure 48 (e.g., a scalloped support ring/plate) configured for axially positioning and/or supporting an axial second side surface 50 of the primary seal device 38 relative to the stationary structure 24. However, the second ring structure 48 may be omitted where, for example, the second side surface 50 of the primary seal device 38 is abutted against another component/portion of the stationary structure 24 (e.g., an annular or castellated shoulder) or otherwise axially positioned/secured with the stationary structure 24; e.g., see FIG. 2.

Figure 3:
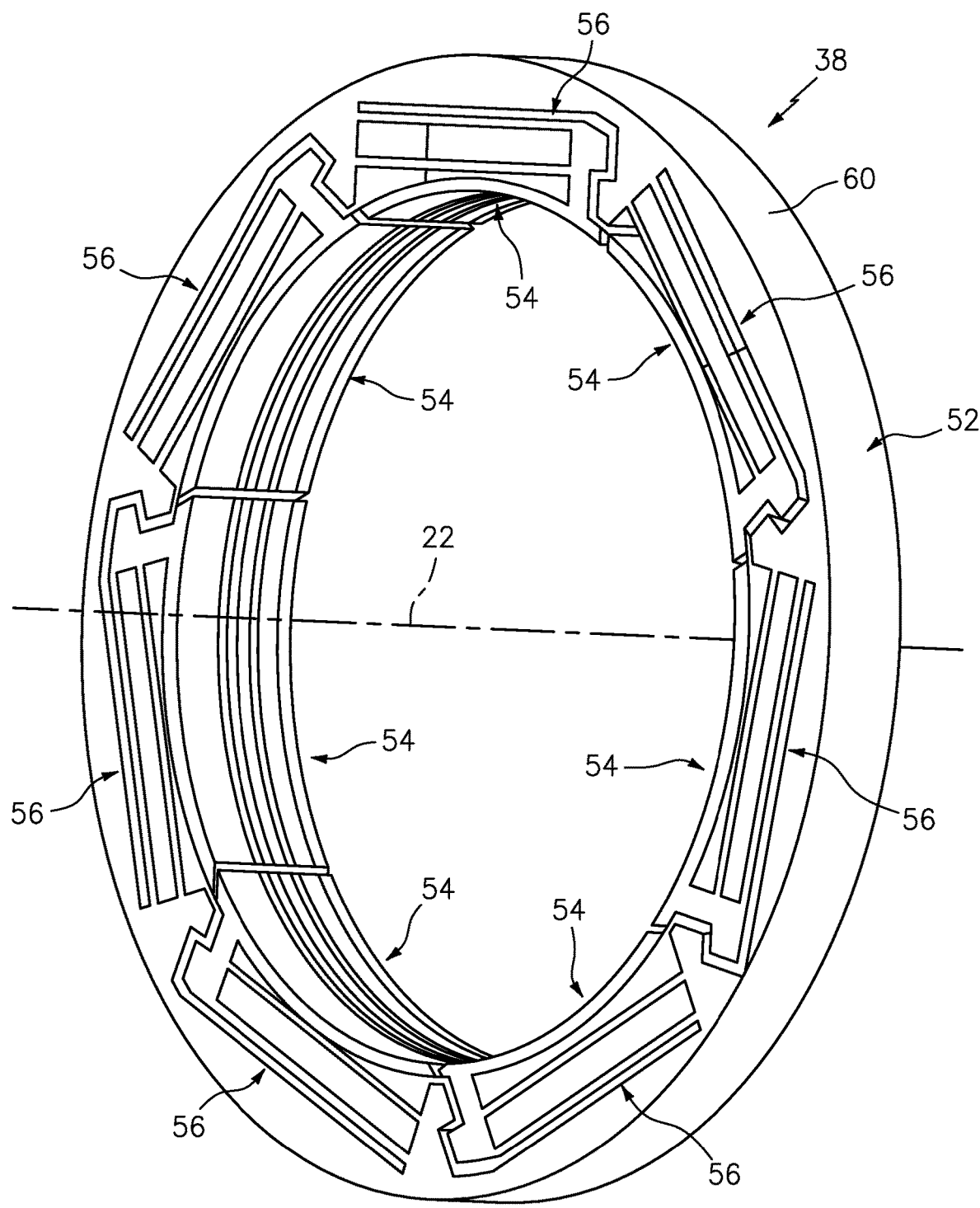
FIG. 3 is a perspective general illustration of a primary seal device for the assembly.

Referring to FIG. 3, the primary seal device 38 is configured as an annular seal device such as, but not limited to, a non-contact hydrostatic seal device. The primary seal device 38 includes a seal base 52, a plurality of seal shoes 54, a plurality of spring elements 56 (see also FIGS. 4-6).

Figure 4:
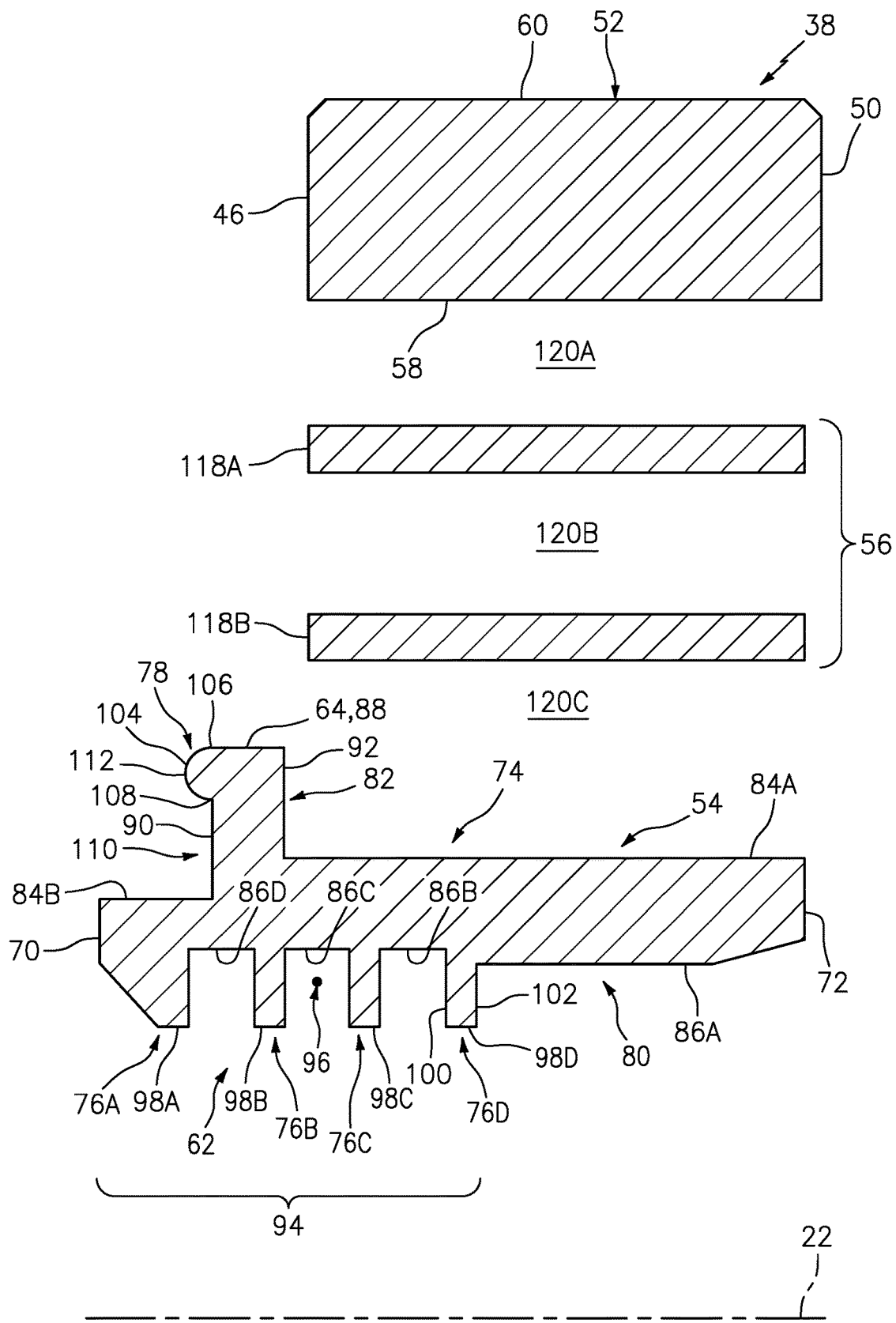
FIG. 4 is a partial side sectional illustration of the primary seal device.

The seal base 52 may be configured as an annular full hoop body. The seal base 52 of FIG. 3 extends circumferentially about (e.g., completely around) the axial centerline 22. The seal base 52 is configured to extend circumferentially around and thereby circumscribe and support the seal shoes 54 as well as the spring elements 56. Referring to FIG. 4, the seal base 52 extends axially along the axial centerline 22 between and forms the axial first side surface 46 and the axial second side surface 50. The seal base 52 extends radially between a seal base inner side 58 and a seal base outer side 60. The seal base outer side 60 radially engages (e.g., is press fit against or otherwise contacts) the stationary structure 24 and its inner surface 32 as shown in FIG. 1.

Referring to FIG. 3, the seal shoes 54 may be configured as arcuate bodies and are arranged circumferentially around the axial centerline 22 in an annular array. Each seal shoe 54, for example, is arranged circumferentially between and next to (e.g., in close proximity) a pair of adjacent circumferentially neighboring seal shoes 54. The annular array of the seal shoes 54 extends circumferentially about (e.g., completely around) the axial centerline 22, thereby forming an inner bore at an inner side 62 of the primary seal device 38. As best seen in FIG. 1, the inner bore is sized to receive the rotating seal land 34, where the rotating structure 26 projects axially through (or into) the inner bore formed by the seal shoes 54.

Figure 5:
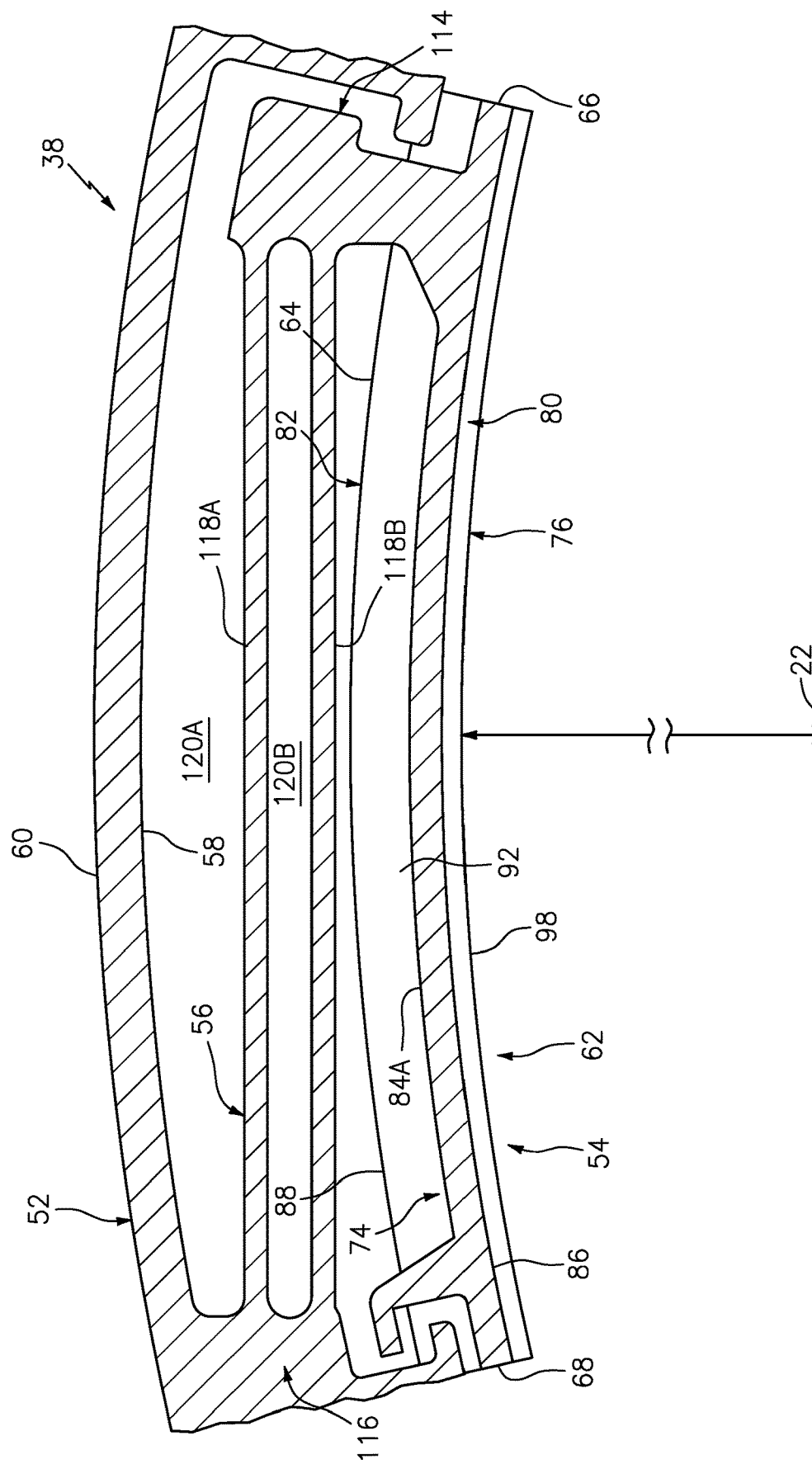
FIG. 5 is a cross-sectional illustration of a portion of the primary seal device.
Figure 6:
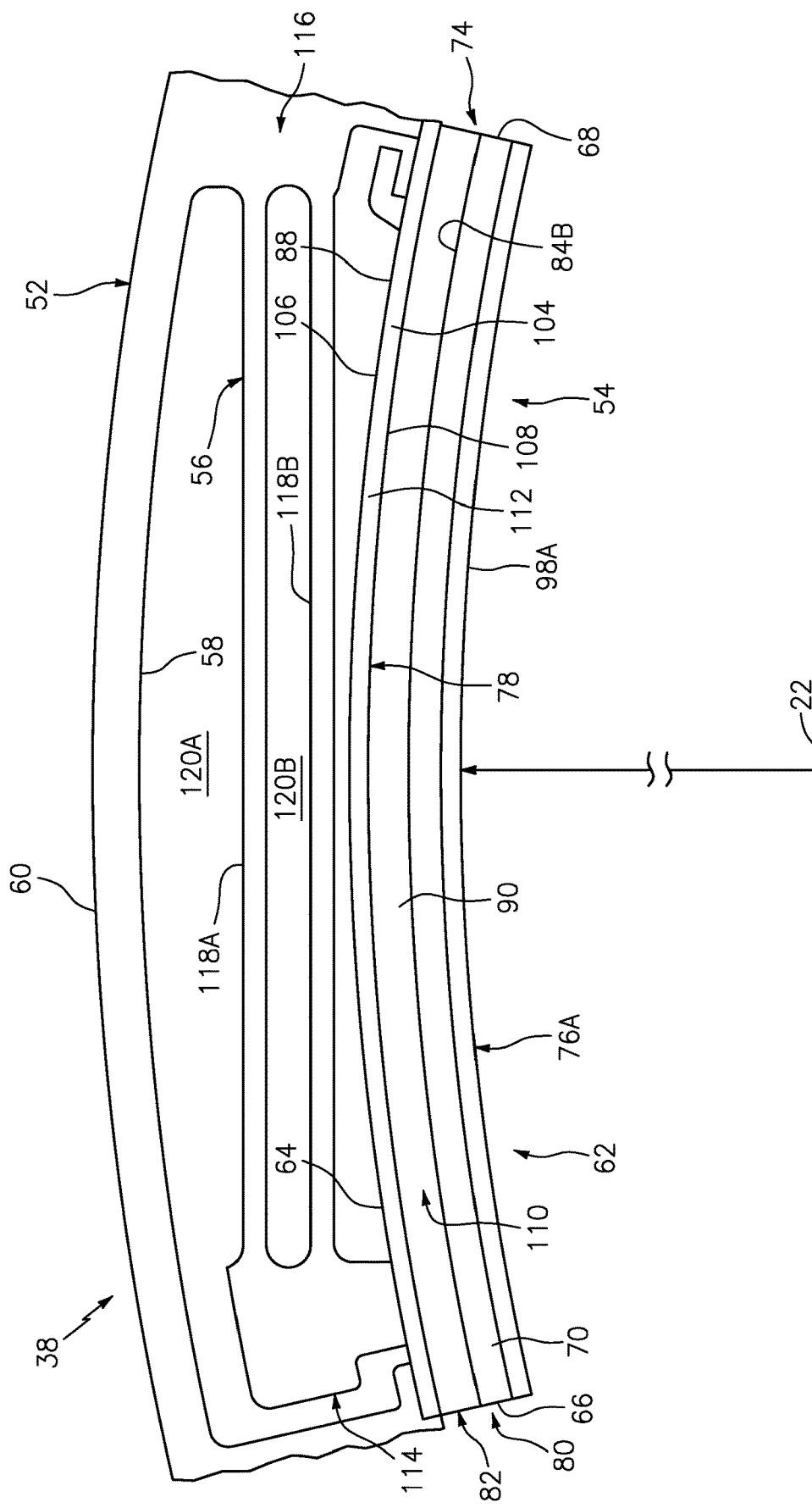
FIG. 6 is an illustration of an upstream side of a portion of the primary seal device.

Referring to FIGS. 5 and 6, each of the seal shoes 54 extends radially from the inner side 62 of the primary seal device 38 to an outer side 64 of that seal shoe 54. Each of the seal shoes 54 extends circumferentially about the axial centerline 22 between opposing circumferential first and second ends 66 and 68 of that seal shoe 54. Referring to FIG. 4, each of the seal shoes 54 extends axially along the axial centerline 22 between an axial first (e.g., upstream and/or high pressure) side 70 and an axial second (e.g., downstream and/or low pressure) side 72 of the seal shoe 54. The axial seal shoe first side 70 may be an upstream and/or high pressure side relative, for example, to flow of leakage fluid across the primary seal device 38. The axial seal shoe first side 70 is axially offset/displaced from the axial first side surface 46. The axial seal shoe second side 72 may be a downstream and/or low pressure side relative, for example, to the flow of leakage fluid across the primary seal device 38. The axial seal shoe second side 72 may be axially aligned with the axial second side surface 50. The seal shoes 54 of the present disclosure, however, are not limited to such exemplary relationships.

Each of the seal shoes 54 includes a seal shoe base 74 and one or more seal shoe projections 76A-D (generally referred to as "76"); e.g., inner projections such as rails and/or teeth. Each seal shoe 54 also includes a seal shoe rib 78.

The seal shoe base 74 of FIG. 4 includes an inner portion 80 and an outer portion 82. The base inner portion 80 may be configured as a carrier for the one or more seal shoe projections 76 and the base outer portion 82. The base outer portion 82 may be configured as a (e.g., non-rotating) seal land for the one or more secondary seal devices 40 (see FIG. 1).

The base inner portion 80 includes one or more (e.g., arcuate) base outer surfaces 84A and 84B (generally referred to as "84") and one or more (e.g., arcuate) base inner surfaces 86A-D (generally referred to as "86"). The base inner portion 80 extends radially between the one or more base outer surfaces 84 and the one or more base inner surfaces 86. Referring to FIGS. 5 and 6, the base inner portion 80 extends circumferentially about the axial centerline 22 between and to the circumferentially opposing seal shoe ends 66 and 68. The base inner portion 80 includes a first end surface at the seal shoe first end 66 and a second end surface at the seal shoe second end 68. Each of the end surfaces may be a flat planar surface. Each of the end surfaces, for example, may have a straight sectional geometry when viewed, for example, in a plane perpendicular to the axial centerline 22; e.g., the plane of FIG. 5 or 6. Referring to FIG. 4, the base inner portion 80 extends axially between the seal shoe first side 70 and the seal shoe second side 72.

Referring to FIG. 6, the base outer portion 82 extends circumferentially about the axial centerline 22 between and to the opposing seal shoe ends 66 and 68. Referring again to FIG. 4, the base outer portion 82 is arranged at the seal shoe outer side 64. The base outer portion 82 of FIG. 4, for example, projects radially out from the base inner portion 80 and its outer surfaces 84 to an unsupported radial distal end 88 of the base outer portion 82. This base outer portion radial distal end 88 is arranged at the seal shoe outer side 64. The base outer portion 82 extends axially along the axial centerline 22 between opposing axial sides and associated arcuate, planar side surfaces 90 and 92 of the base outer portion 82. The base outer portion first side surface 90 is axially displaced from the seal shoe first side 70 by a non-zero axial distance. The base outer portion second side surface 92 is axially displaced from the seal shoe second side 72 by a non-zero axial distance.

The base outer portion 82 may be generally axially aligned with and/or axially overlapped by the one or more seal shoe projections 76. The base outer portion 82 of FIG. 4, for example, is axially aligned with and is axially overlapped by the seal shoe projection 76B. The present disclosure, however, is not limited to such an exemplary arrangement. For example, in other embodiments, the base outer portion 82 may be axially aligned with any other one of the seal shoe projections 76 (e.g., 76A, 76C and/or 76D). In still other embodiments, the base outer portion 82 may be axially offset from the seal shoe projections 76. The base outer portion 82, for example, may be arranged axially upstream of (e.g., towards the side 70) or axially downstream of (e.g., towards the side 72) the one or more seal shoe projections 76. In another example, the base outer portion 82 may be arranged axially between an adjacent/neighboring pair of seal shoe projections 76 (e.g., 76A and 76B, 76B and 76C, 76C and 76D).

The seal shoe projections 76 are arranged at discrete axial locations along the axial centerline 22 and the seal shoe base 74. Each pair of axially adjacent/neighboring projections 76 may thereby be axially separated by an (e.g., arcuate) inter-projection gap. The seal shoe projections 76 of FIG. 4 are configured parallel to one another.

The seal shoe projections 76 may be arranged in a concentrated grouping 94. This grouping 94 may be asymmetrically arranged axially along the axial centerline 22 between the axial seal shoe first side 70 and the axial seal shoe second side 72. For example, an axial center 96 (e.g., midpoint) of the grouping 94 of the seal shoe projections 76 in FIG. 4 is arranged closer to the seal shoe first side 70 than the seal shoe second side 72. The seal shoe projections 76 of the present disclosure, however, are not limited to the foregoing exemplary asymmetric configuration.

The seal shoe projections 76 are connected to (e.g., formed integral with or otherwise attached to) the seal shoe base 74 and its base inner portion 80. Each of the seal shoe projections 76 projects radially inwards from the seal shoe base 74, the base inner portion 80 and the base inner surfaces 86 to an unsupported distal projection end.

Each of the seal shoe projections 76 has a projection inner surface 98A-D (generally referred to as "98") at its unsupported distal projection end. One or more or each of the projection inner surfaces 98 may also be at (e.g., on, adjacent or proximate) the inner side 62 of the primary seal device 38. Each projection inner surface 98 may be an arcuate surface. Each projection inner surface 98, for example, may have an arcuate sectional geometry when viewed, for example, in a plane perpendicular to the axial centerline 22; e.g., the plane of FIG. 5 or 6. The projection inner surfaces 98 are configured to be arranged in close proximity with (but not touch) and thereby sealingly mate with the outer seal land surface 36 in a non-contact manner (see FIG. 1), where the rotating structure 26 projects axially through (or into) the inner bore formed by the seal shoes 54.

Each of the seal shoe projections 76 extends axially between opposing projection end surfaces (e.g., 100 and 102). Each of these end surfaces (e.g., 100 and 102) extends radially between and may be contiguous with a respective one of the projection inner surfaces 98 (e.g., 98D in FIG. 4) and a respective one of the base inner surfaces 86 (e.g., 86A and 86B in FIG. 4).

Figure 7:
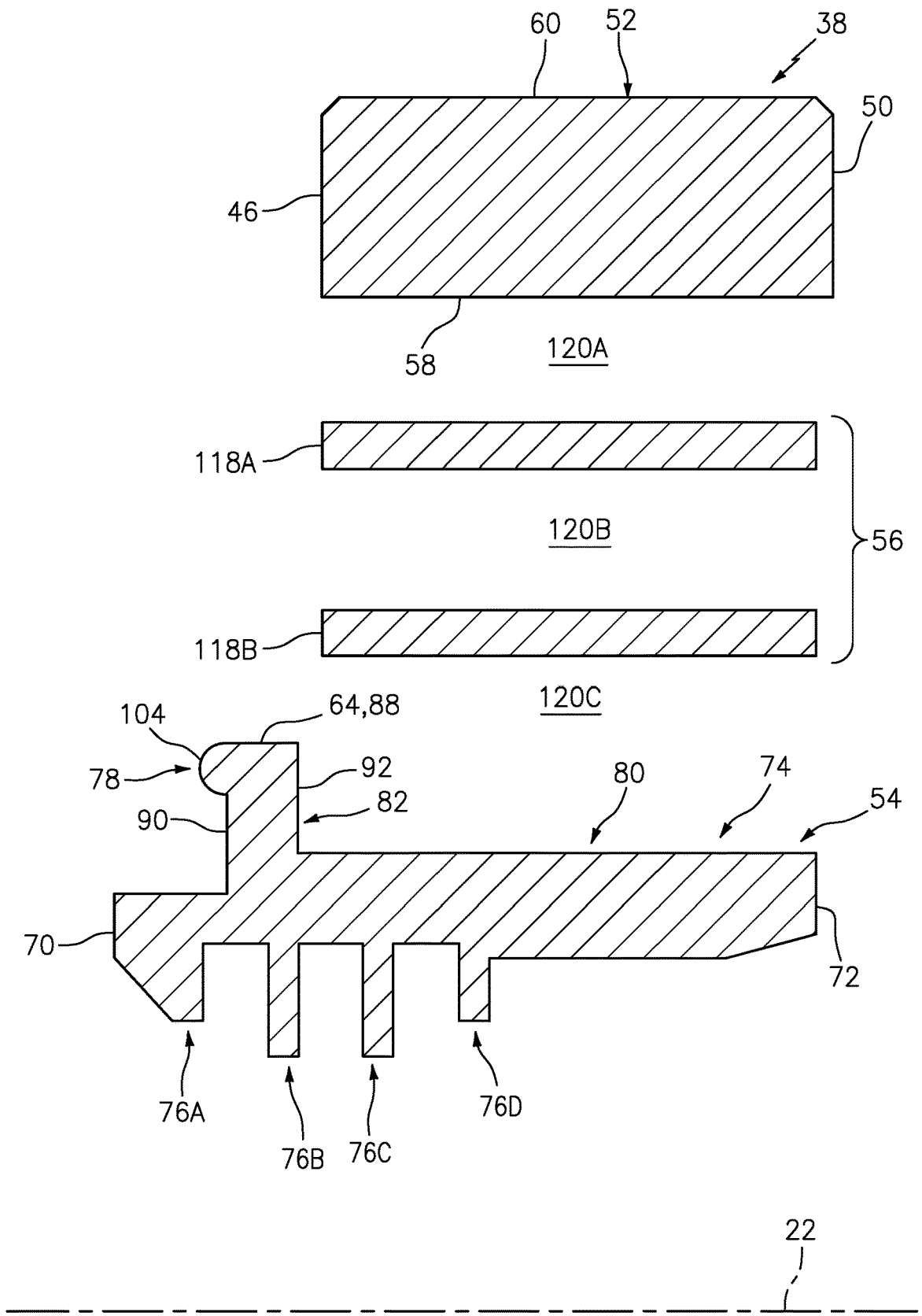
FIG. 7 is a partial side sectional illustration of the primary seal device configured with projections having different radial heights.

Each of the seal shoe projections 76 of FIG. 4 has the same radial height. In other embodiments, however, one or more of the seal shoe projections 76 may have a different radial height than at least another one of the seal shoe projections 76; e.g., see FIG. 7.

Referring to FIG. 4, the seal shoe rib 78 is configured to form a seal land surface 104 (e.g., a crowned surface) for the base outer portion 82; e.g., the seal land. More particularly, the seal shoe rib 78 is configured to form a controlled contact surface for the one or more secondary seal devices 40 (see FIG. 1) as described below in further detail.

Referring to FIG. 6, the seal shoe rib 78 and its seal land surface 104 extend circumferentially about the axial centerline 22 between and to the opposing seal shoe ends 66 and 68. Referring to FIG. 4, the seal shoe rib 78 and its seal land surface 104 extend radially between opposing radial sides 106 and 108 of the seal shoe rib 78. The outer rib side 106 may be arranged at (e.g., on, adjacent or proximate) the seal shoe outer side 64. The inner rib side 108 may be radially displaced from the seal base outer surface 84A by a non-zero radial distance. Thus, the seal shoe rib 78 is radially outboard of and forms an outer radial peripheral boundary of an arcuate channel 110. This channel 110 extends axially along the axial centerline 22 into the seal shoe 54 to the surface 90, and extends radially between the surfaces 104 and 84B. The seal shoe rib 78 of FIG. 4 also projects axially outward from the seal shoe base 74 and its base outer portion 82 to the seal land surface 104 and an unsupported, axial distal end 112 of that seal shoe rib 78.

The seal shoe rib 78 and the seal land surface 104 of FIG. 4 are each configured with a crowned sectional geometry. The seal land surface 104 of FIG. 4, for example, is configured with a curved (e.g., arcuate, semi-circular, splined and/or otherwise rounded) sectional geometry when viewed, for example, in a plane coincident with and/or parallel with the axial centerline 22; e.g., plane of FIG. 4. The present disclosure, however, is not limited to such an exemplary curved or even crowned sectional geometry as described below in further detail.

The seal land surfaces 104 of the seal shoes 54 are configured to collectively form a generally annular, but circumferentially segmented, seal land surface. More particularly, when the seal shoes 54 are arranged in the array (see FIG. 3), the seal land surfaces 104 collectively form the annular seal land surface. Referring to FIG. 1, this annular seal land surface and, thus, the surfaces 104 are configured to be sealingly engaged (e.g., axially contacted) the one or more secondary seal devices 40 as described below in further detail.

Referring to FIG. 3, the spring elements 56 are arranged circumferentially about the axial centerline 22 in an annular array. Referring to FIGS. 4 and 5, the spring elements 56 are also arranged (e.g., radially) between the seal shoes 54 and the seal base 52. Each of the spring elements 56 is configured to moveably and resiliently connect a respective one of the seal shoes 54 to the seal base 52.

The spring element 56 of FIG. 5 includes first and second mounts 114 and 116 (e.g., inner and outer radial fingers/projections) and one or more spring beams 118A and 118B (generally referred to as "118"). The first mount 114 may be directly or indirectly connected to (e.g., formed integral with or otherwise attached to) a respective one of the seal shoes 54 at (e.g., on, adjacent or proximate) the seal shoe first end 66, where the opposing seal shoe second end 68 is free floating (e.g., the seal shoe is cantilevered from the first mount 114). The first mount 114 projects radially outward from the seal shoe base 74.

The second mount 116 may be directly or indirectly connected to the seal base 52, and is generally circumferentially aligned with or near the seal shoe second end 68. The second mount 116 is therefore disposed a non-zero circumferential distance from the first mount 114. The second mount 116 projects radially inward from the seal base 52.

The spring beams 118 are configured as resilient, biasing members of the primary seal device 38. The spring beams 118 of FIG. 5, for example, are configured as cantilevered-leaf springs. These spring beams 118 may be radially stacked and spaced apart from one another so as to form a four bar linkage with the first mount 114 and the second mount 116. More particularly, each of the spring beams 118 may be directly or indirectly connected to the first mount 114 and the second mount 116. Each of the spring beams 118 extends laterally (e.g., circumferentially or tangentially) between and to the first mount 114 and the second mount 116. The spring beams 118 of FIG. 5 may thereby laterally overlap a major circumferential portion (e.g., ~65-95%) of the respective seal shoe 54.

During operation of the primary seal device 38 of FIG. 1, rotation of the rotating structure 26 may develop aerodynamic forces and apply a fluid pressure to the seal shoes 54 causing each seal shoe 54 to respectively move radially up and down relative to the outer seal land surface 36. The fluid velocity may increase as a gap between a respective seal shoe 54 and the outer seal land surface 36 increases, thus reducing pressure in the gap and drawing the seal shoe 54 radially inwardly toward the outer seal land surface 36. As the gap closes, the velocity may decrease and the pressure may increase within the gap, thus, forcing the seal shoe 54 radially outwardly from the outer seal land surface 36. The respective spring element 56 and its spring beams 118 may deflect and move with the seal shoe 54 to enable provision of a primary seal of the gap between the outer seal land surface 36 and the seal shoe projections 76 within predetermined design tolerances.

While the primary seal device 38 described above is operable to generally seal the annular gap between the stationary structure 24 and the rotating structure 26, the fluid (e.g., gas) may still flow axially through passages 120A-C (generally referred to as "120") defined by radial air gaps between the elements. The secondary seal assembly 44 and its one or more secondary seal devices 40 therefore are provided to seal off these passages 120 and, thereby, further and more completely seal the annular gap.

Figure 8:
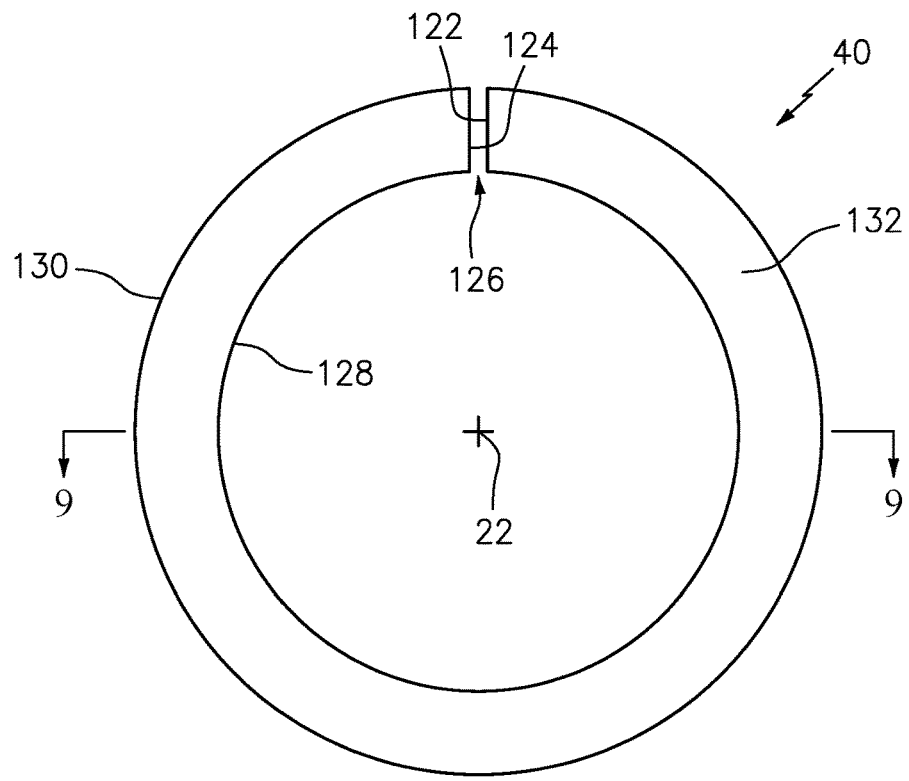
FIG. 8 is an illustration of a secondary seal device.

Referring to FIG. 8, each of the secondary seal devices 40 may be configured as an annular seal plate such as, but not limited to, a split ring seal element. Each secondary seal device 40 (e.g., seal plate), for example, may be configured as (e.g., only include) or otherwise include a monolithic, unitary body that extends at least substantially (e.g., more than 330, 340, 350 degrees) around the axial centerline 22. The secondary seal device of FIG. 8, for example, extends substantially around the axial centerline 22 between opposing circumferential ends 122 and 124, which ends 122 and 124 are disposed next to one another thereby forming a slit/cut 126 through that secondary seal device 40. The secondary seal device 40 of FIG. 8 extends radially between opposing radial sides 128 and 130. The secondary seal device 40 of FIG. 9 extends axially along the axial centerline 22 between opposing (e.g., planar or conical) annular side surfaces 132 and 134. The present disclosure, however, is not limited to the foregoing exemplary seal plate configuration. For example, in other embodiments, one or more or each secondary seal device may be configured as a full-hoop body seal plate.

Figure 9:
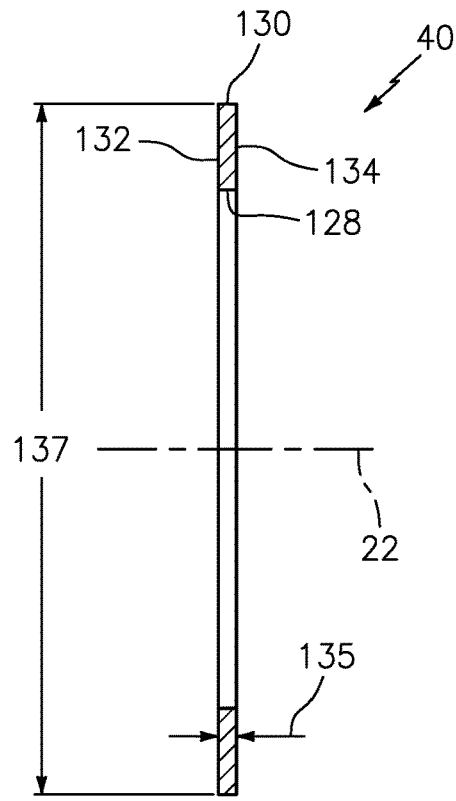
FIG. 9 is a side sectional illustration of the secondary seal device taken along line 9-9 in FIG. 8.

Referring still to FIG. 9, one or more or each secondary seal device 40 is configured such that a ratio of its axial thickness 135 (e.g., a distance between the side surfaces 132 and 134) to radial height 137 (e.g., average sectional diameter) is relatively small. The ratio of the radial height 137 to the axial thickness 135, for example, may be greater than 400:1 and/or less than 4000:1. The ratio of the radial height 137 to the axial thickness 135, for example, may be between 400:1 and 4000:1; e.g., in some embodiments between 400:1 and 1000:1; in some embodiments between 1000:1 and 2000:1; in some embodiments between 2000:1 and 3000:1; or in some embodiments between 3000:1 and 4000:1. For example, the radial height 137 may be twenty inches, the axial thickness 135 may be 0.015 inches and the ratio may be about 1,333:1. In another example, the radial height 137 may be forty inches, the axial thickness 135 may be 0.010 inches and the ratio may be about 4000:1. In still another example, the radial height 137 may be five inches, the axial thickness 135 may be 0.0125 inches and the ratio may be about 400:1. Each secondary seal devices 40 may thereby be torsionally flexible. The present disclosure, however, is not limited to the foregoing exemplary dimensional relationships.

Figure 10:
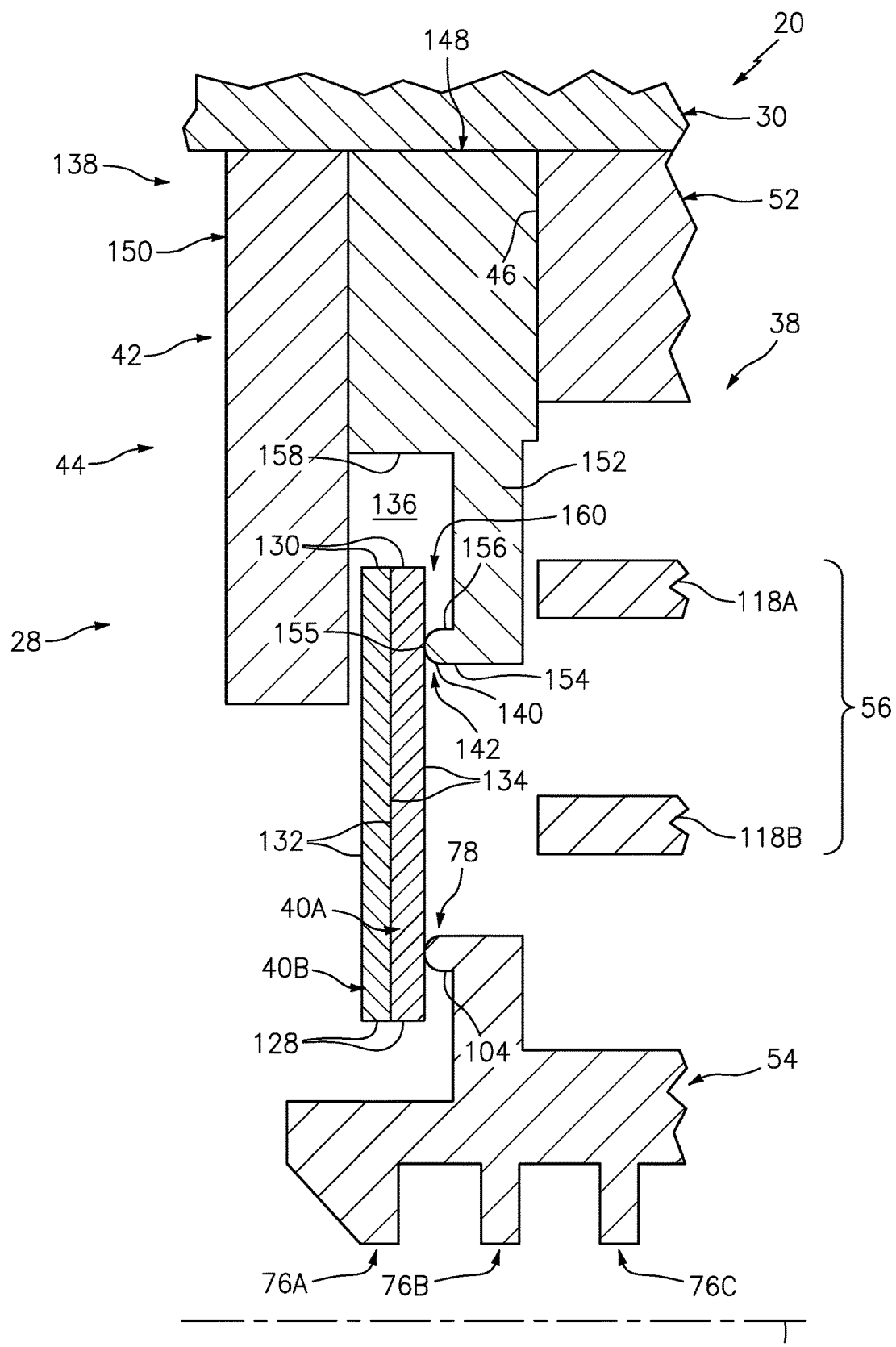
FIG. 10 is an enlarged side sectional illustration of a portion of the assembly.

The secondary seal devices 40 (e.g., seal plates) of FIG. 10 are arranged together in an axial stack. In this stack, each of the secondary seal devices 40 axially engages (e.g., contacts) another adjacent one of the secondary seal devices 40. Note, the slit/cut 126 (not visible in FIG. 10) in one of the secondary seal devices 40 may be clocked circumferentially about the axial centerline 22 from the slit/cut 126 in the other one of the secondary seal devices 40 such that each slit/cut 126 is covered and, thus, sealed by the adjacent secondary seal device 40.

The stack of the secondary seal devices 40 is arranged with the first ring structure 42. More particularly, the stack of the secondary seal devices 40 project radially, in a radially outward direction, into an annular channel 136 in the first ring structure 42. Note, each of the secondary seal devices 40 may be operable to freely float within the annular channel 136. For example, the rotational equipment assembly 20 may not include any fasteners (e.g., pins, bolts, screws, etc.) that fix or otherwise constrain movement of one or more or any of the secondary seal devices 40 relative to a stationary support structure 138 (e.g., a combination of the components 42 and 52) and/or relative to one, some or any of the seal shoes 54. No fasteners, for example, may be included that engage (e.g., contact) one or more or any of the secondary seal devices 40. In another example, the rotational equipment assembly 20 may not include any biasing elements (e.g., spring elements, etc.) that constrain movement of one or more or any of the secondary seal devices 40 relative to the stationary support structure 138 and/or relative to one, some or any of the seal shoes 54. No biasing elements, for example, may be included that engage (e.g., contact) one or more or any of the secondary seal devices 40. With such a free floating configuration, each secondary seal device 40 (or the devices 40 collectively in the stack) may move within the annular channel 136 based on a pressure differential axially thereacross without, for example, any other outside influences.

The stack of the secondary seal devices 40 is operable to axially engage (e.g., contact) and form a seal between (a) the seal land surface 104 of one or more or each seal shoe 54 and (b) an annular seal land surface 140 of the stationary support structure 138. The stack of the secondary seal devices 40 is thereby operable to seal an annular gap between the seal shoe(s) 54 and the stationary support structure 138 and, more particularly, the first ring structure 42. It is worth noting, the torsional flexibility of the secondary seal devices 40 enables those secondary seal devices 40 to deform and maintain engagement (e.g., contact) with each seal land surface 104, 140. Each secondary seal device 40, for example, may twist, bend and/or otherwise deform so as to maintain full engagement (e.g., contact) with each seal land surface 104, 140.

The annular seal land surface 140 may have a similar configuration (e.g., sectional geometry) as each of the seal land surfaces 104. The annular seal land surface 140, for example, may be formed by an annular rib 142 of the first ring structure 42. This annular rib 142 and the annular seal land surface 140 of FIG. 10 are each configured with a crowned sectional geometry. The annular seal land surface 140 of FIG. 10, for example, is configured with a curved (e.g., arcuate, semi-circular, splined and/or otherwise rounded) sectional geometry when viewed, for example, in a plane coincident with and/or parallel with the axial centerline 22; e.g., plane of FIG. 10. The present disclosure, however, is not limited to such an exemplary curved or even crowned sectional geometry as described below in further detail.

Figure 11:
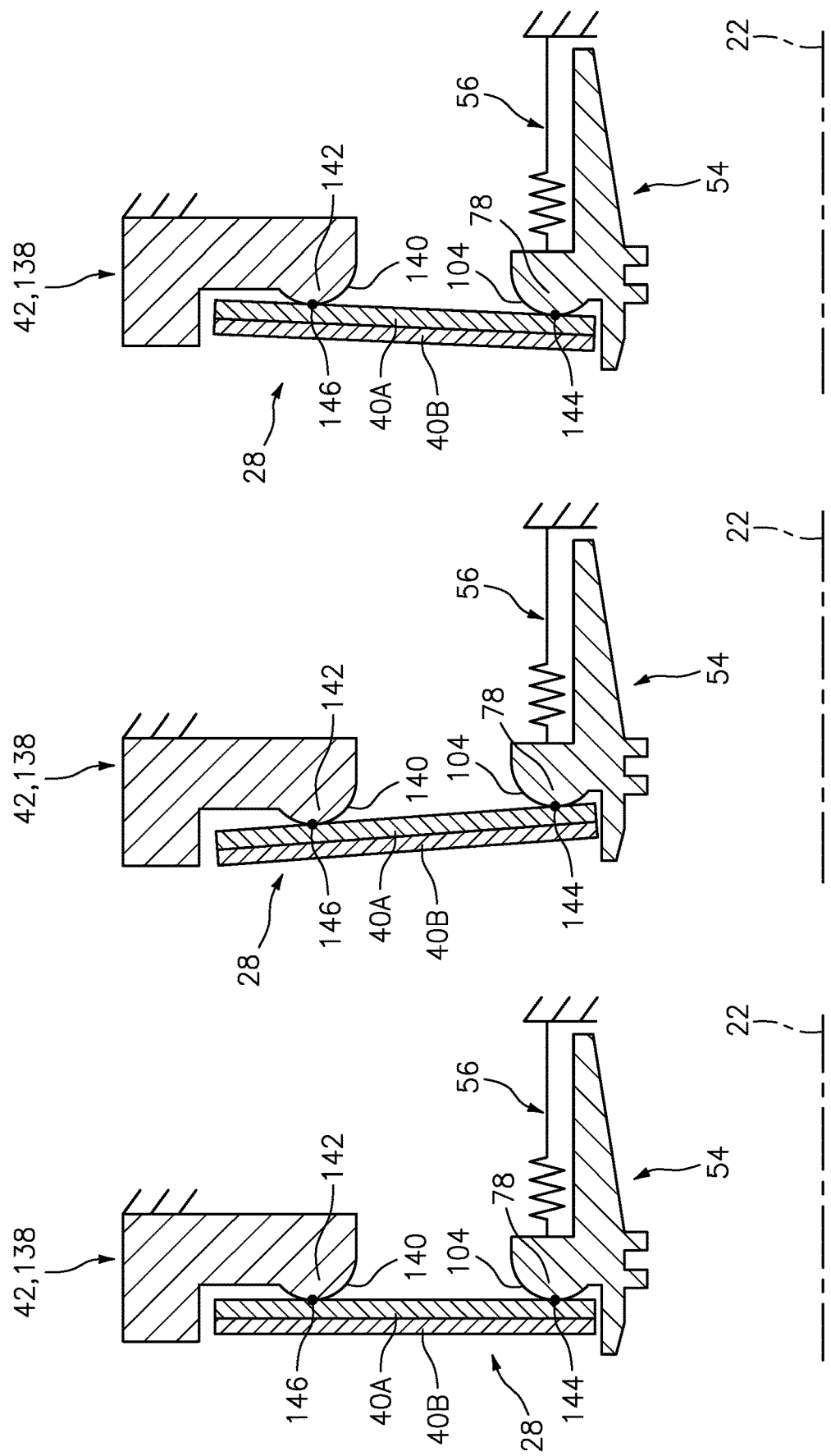
FIGS. 11A-11C are partial schematic side sectional illustrations of the assembly depicting different axial positions of a seal shoe relative to a static support structure.

Referring to FIG. 11A, under ideal conditions as well as when the rotational equipment is non-operation, the seal land surfaces 104 and 140 may be axially aligned with one another. This alignment enables the stack of the secondary seal devices 40 to slide radially against, but maintain a seal engagement with, one or more or each of the seal shoe ribs 78 and their seal land surfaces 104 and/or the rib 142 and its seal land surface 140 as the seal shoes 54 move radially relative to the outer seal land surface 36 (see FIG. 1) as described above. However, referring to FIGS. 11B and 11C, the seal land surfaces 104 and 140 may become axially misaligned due to vibrations within the rotational equipment, pressure differential fluctuations across the seal assembly 28 and/or thermally induced movement of one or more components of the rotational equipment assembly 20. The provision and configuration of the seal land surfaces 104 and/or 140, however, enables the seal assembly 28 to accommodate such axial misalignment. Furthermore, as discussed above, the torsional flexibility of the secondary seal devices 40 enables the secondary seal devices 40 to deform and maintain engagement (e.g., contact) with each seal land surface 104, 140. For example, by providing each seal land surface 104, 140 with a crown, the stack of secondary seal devices 40 may roll along the seal land surfaces 104 and 140 and thereby maintain sealing engagement with the ribs 78 and 142. Furthermore, the crown of FIGS. 11A-11C may also enable the secondary seal devices 40 to pivot about and/or slide along the seal land surfaces 104 and 140 with relatively low resistance. This in turn may enable maintenance of contact points 144 and 146 between the elements 40 and 54, 40 and 42/138 during axial shifting of the seal shoe(s) 54 relative to the stationary support structure 138.

Referring to FIG. 10, the first ring structure 42 may include a secondary seal device support ring 148 and a retention ring 150. The support ring 148 is configured with an (e.g., monolithic, unitary) annular full hoop body, which extends circumferentially about (e.g., completely around) the axial centerline 22.

The support ring 148 of FIG. 10 includes the annular rib 142 and its seal land surface 140. The support ring rib 142, for example, projects axially out from a base 152 of the support ring 148 to the seal land surface 140 and an unsupported distal end 155 of the support ring rib 142. The support ring rib 142 and its seal land surface 140 extend radially between opposing radial sides 154 and 156 of the support ring rib 142. The inner rib side 154 may be arranged at (e.g., on, adjacent or proximate) an inner side of the support ring 148. The outer rib side 156 may be radially displaced from an end surface 158 of the annular channel 136 by a non-zero radial distance. Thus, the support ring rib 142 is radially inboard of and forms an inner radial peripheral boundary of an arcuate channel/groove 160 adjacent the arcuate channel 136. The support ring rib 142 may also extend (e.g., uninterrupted) circumferentially about (e.g., completely around) the axial centerline 22.

The retention ring 150 is configured with an annular full hoop body, which extends circumferentially about (e.g., completely around) the axial centerline 22. The retention ring 150 is disposed axially adjacent and may be engaged with (e.g., axially contact, abut against) the support ring 148. The stack of the secondary seal devices 40 may thereby be captured within the annular channel 136 formed between the rings 148 and 150.

Figure 12:
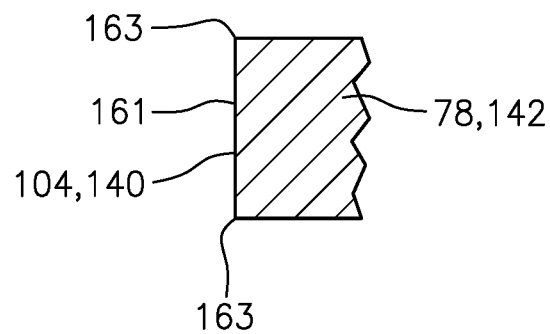
FIGS. 12-14 are partial side sectional illustrations of various rib configurations.
Figure 13:
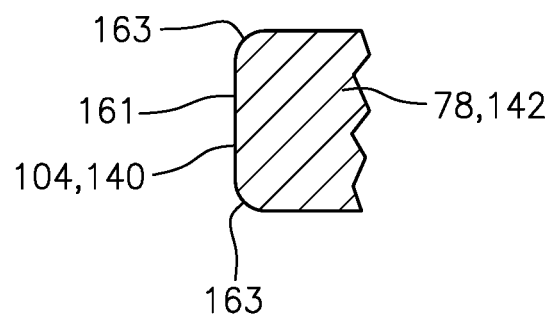
Figure 14:
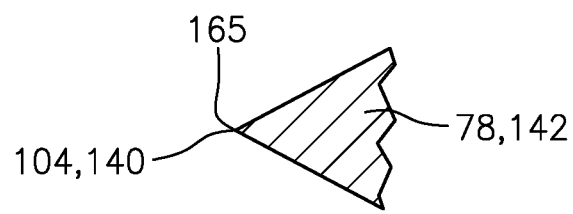

The seal land surfaces 104 and 140 are described above as having curved sectional geometries. However, in other embodiments, one or more or each of the seal land surfaces 104 and/or 140 and, thus, its associated rib 78, 142 may have a non-curved or not completely curved sectional geometry. For example, referring to FIG. 12, one or more or each of the seal land surfaces 104 and/or 140 and, thus, its associated rib 78, 142 may have a rectangular sectional geometry with a flat planar surface 161 for at least a portion or an entirety of the seal land surface 104, 140. One or more or each corner 163 of the rib 78, 142 may be relatively sharp as shown, for example, in FIG. 12. One or more or each corner 163 of the rib 78, 142 may alternatively be relatively blunt (e.g., rounded, chamfered, etc.) as shown, for example, in FIG. 13. In still another example, referring to FIG. 14, one or more or each of the seal land surfaces 104 and/or 140 and, thus, its associated rib 78, 142 may have a non-rectangular polygonal sectional geometry (e.g., a pointed sectional geometry, a triangular sectional geometry) and/or extend to a point or tip 165. The seal land surfaces 104 and 140 and the ribs 78 and 142, however, are not limited to the foregoing exemplary sectional geometries.

Figure 15:
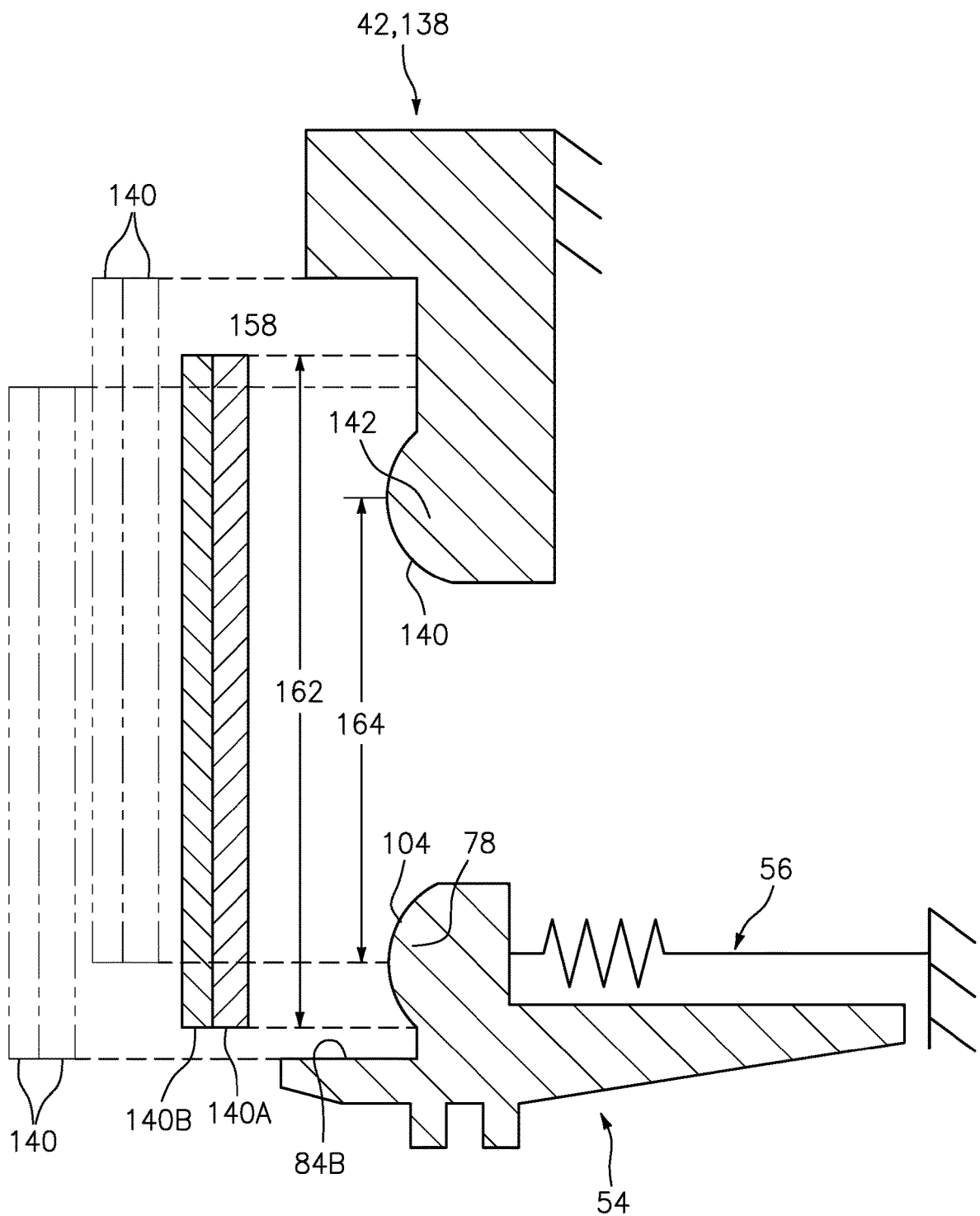
FIG. 15 is a partial schematic side sectional illustration of the assembly depicting its secondary seal devices at different radial positions.

In some embodiments, referring to FIG. 15, a radial height 162 of one or some or each of the secondary seal devices 40 may be sized to be greater than a radial distance between the ribs 78 and 142 and, more particularly, a radial distance 164 between peaks of the ribs 78 and 142. Note, since the seal shoes 54 may move radially up and down relative to the stationary support structure 138 during operation, the radial distance 164 is typically measured for conditions when the peaks of the ribs 78 and 142 are farthest apart from one another. With such this configuration, the secondary seal devices 40 may (e.g., always) maintain sealing engagement with the seal land surfaces 104 and 140.

In some embodiments, the channel end surface 158 may be configured as a radial outer stop/limiter for radial outward movement of the secondary seal devices 40.

In some embodiments, the seal shoe outer surface 84B may be configured as a radial inner stop/limiter for radial inward movement of the secondary seal devices 40.

Figure 16:
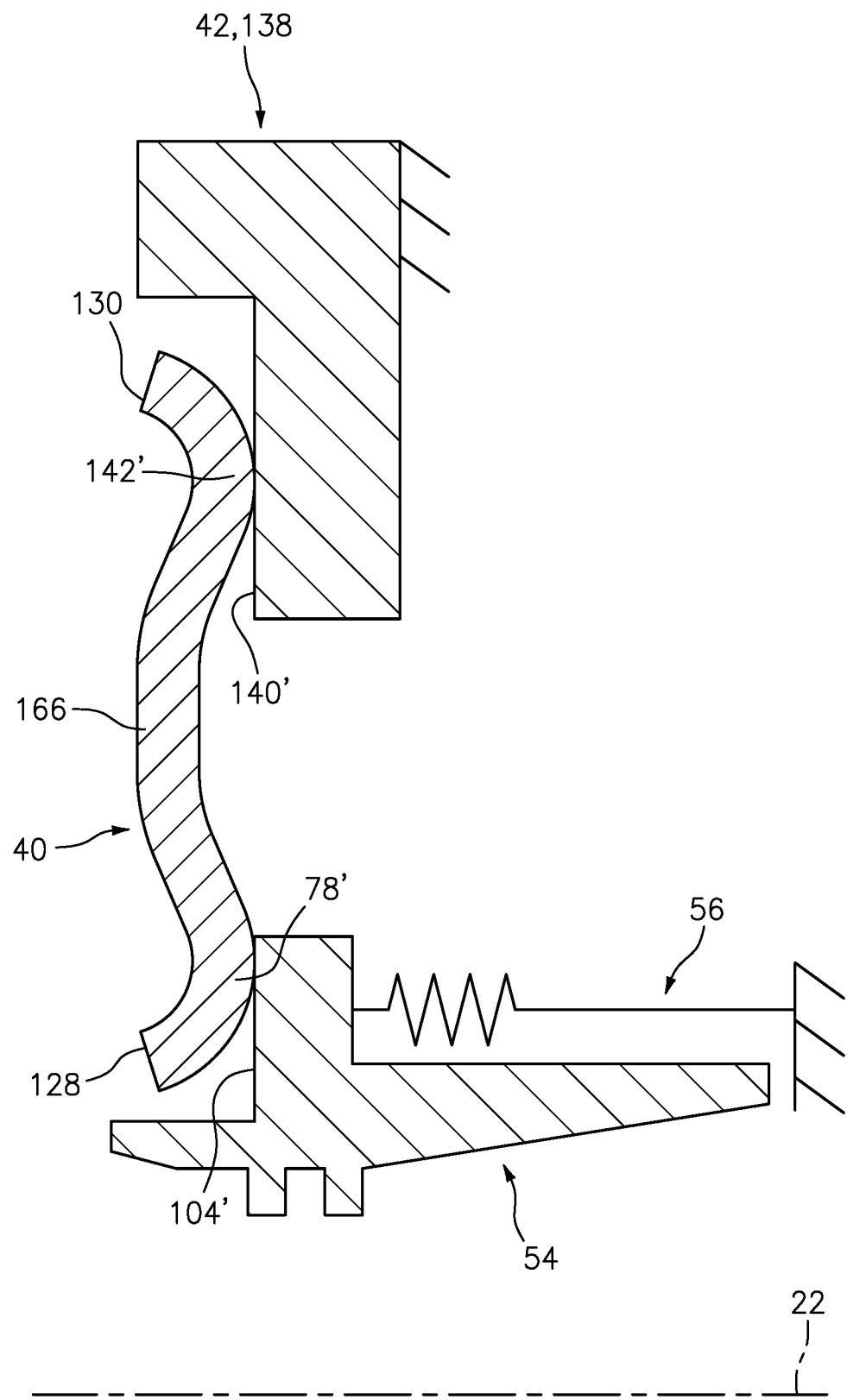
FIG. 16 is a partial schematic side sectional illustration of the assembly with an alternative secondary seal device.

In some embodiments, referring to FIG. 16, the inner and/or the outer ribs (e.g., the ribs 78 and 142 in FIG. 10) may alternatively be configured with at least one of the secondary seal devices 40 (one shown in FIG. 16). The secondary seal device 40 of FIG. 16, for example, is configured with an annular inner rib 78' (e.g., corresponding to the rib 78 in FIG. 10) and/or an annular outer rib 142' (e.g., corresponding to the rib 142 in FIG. 10). The inner rib 78' is arranged at (e.g., on, adjacent or proximate) or towards the secondary seal device inner end 128. The outer rib 142' is arranged at (e.g., on, adjacent or proximate) or towards the secondary seal device outer end 130. Each rib 78', 142' projects axially along the axial centerline 22 out from a base 166 of the secondary seal device 40 to its a respective unsupported distal end in a similar manner as described above with reference to the ribs 78 and 142 (e.g., see FIG. 10). Each of the ribs 78', 142' may thereby sealingly engage a respective one of the seal land surfaces 104', 140' in a similar manner as described above and, thus, is operable to accommodate axial misalignment between the seal surfaces.

In some embodiments, one or more or each of the seal land surfaces 104 and/or 140 may be partially or completely covered with a protective coating. This protective coating may be a wear coating. The protective coating, for example, may be configured to reduce or prevent (e.g., rubbing) wear of the elements 40, 78 and/or 142.

While the seal land surfaces 104 and 140 are shown in the drawings at certain radial positions, the present disclosure is not limited to configuring those surfaces 104 and 140 thereat. One or more or each of the seal land surfaces 104 and/or 140, for example, may alternatively be positioned further radially outward or further radially inward to, for example, optimize the delta pressure load distribution across the secondary seal devices 40. In this manner, the radial positions of the seal land surfaces 104 and 140 may be tailored to reduce or prevent "see-saw" loading/movement of the secondary seal devices 40.

In some embodiments, as best seen in FIGS. 4 and 5, the primary seal device 38 and some or all of its elements (e.g., 52, 54 and 56) may be configured as a monolithic body. However, the present disclosure is not limited to such a primary seal device construction.

Figure 17:
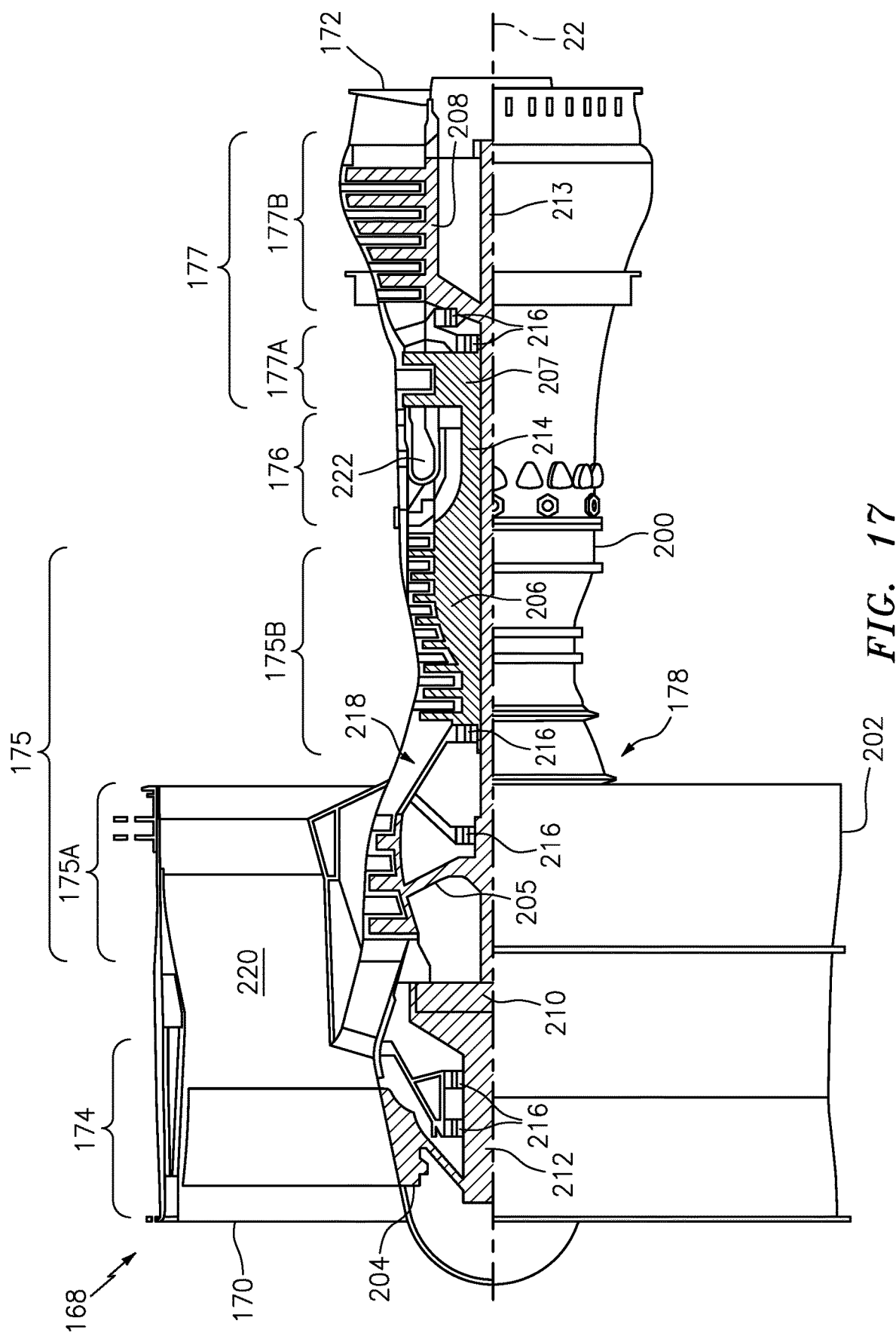
FIG. 17 is a side cutaway illustration of a gas turbine engine.

As described above, the rotational equipment assembly 20 of the present disclosure may be configured with various different types and configurations of rotational equipment. FIG. 17 illustrates one such type and configuration of the rotational equipment—a geared turbofan gas turbine engine 168. Such a turbine engine includes various stationary structures (e.g., bearing supports, hubs, cases, etc.) as well as various rotors (e.g., rotor disks, shafts, shaft assemblies, etc.) as described below, where the stationary structure 24 and the rotating structure 26 of FIG. 1 can respectively be configured as anyone of the foregoing structures in the turbine engine 168 of FIG. 17, or other structures not mentioned herein.

The turbine engine 168 of FIG. 17 extends along the axial centerline 22 between an upstream airflow inlet 170 and a downstream airflow exhaust 172. The turbine engine 168 includes a fan section 174, a compressor section 175, a combustor section 176 and a turbine section 177. The compressor section 175 includes a low pressure compressor (LPC) section 175A and a high pressure compressor (HPC) section 175B. The turbine section 177 includes a high pressure turbine (HPT) section 177A and a low pressure turbine (LPT) section 177B.

The engine sections 174-177B are arranged sequentially along the axial centerline 22 within an engine housing 178. This engine housing 178 includes an inner case 200 (e.g., a core case) and an outer case 202 (e.g., a fan case). The inner case 200 may house one or more of the engine sections 175A-177B; e.g., an engine core. The outer case 202 may house at least the fan section 174.

Each of the engine sections 174, 175A, 175B, 177A and 177B includes a respective rotor 204-208. Each of these rotors 204-208 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 204 is connected to a gear train 210, for example, through a fan shaft 212. The gear train 210 and the LPC rotor 205 are connected to and driven by the LPT rotor 208 through a low speed shaft 213. The HPC rotor 206 is connected to and driven by the HPT rotor 207 through a high speed shaft 214. The shafts 212-214 are rotatably supported by a plurality of bearings 216. Each of these bearings 216 is connected to the engine housing 178 by at least one stationary structure such as, for example, an annular support strut.

During operation, air enters the turbine engine 168 through the airflow inlet 170. This air is directed through the fan section 174 and into a core gas path 218 and a bypass gas path 220. The core gas path 218 extends sequentially through the engine sections 175A-177B. The air within the core gas path 218 may be referred to as "core air". The bypass gas path 220 extends through a bypass duct, which bypasses the engine core. The air within the bypass gas path 220 may be referred to as "bypass air".

The core air is compressed by the compressor rotors 205 and 206 and directed into a combustion chamber 222 of a combustor in the combustor section 176. Fuel is injected into the combustion chamber 222 and mixed with the compressed core air to provide a fuel-air mixture. This fuel air mixture is ignited and combustion products thereof flow through and sequentially cause the turbine rotors 207 and 208 to rotate. The rotation of the turbine rotors 207 and 208 respectively drive rotation of the compressor rotors 206 and 205 and, thus, compression of the air received from a core airflow inlet. The rotation of the turbine rotor 208 also drives rotation of the fan rotor 204, which propels bypass air through and out of the bypass gas path 220. The propulsion of the bypass air may account for a majority of thrust generated by the turbine engine 168, e.g., more than seventy-five percent (75%) of engine thrust. The turbine engine 168 of the present disclosure, however, is not limited to the foregoing exemplary thrust ratio.

The rotational equipment assembly 20 may be included in various turbine engines other than the one described above as well as in other types of rotational equipment. The rotational equipment assembly 20, for example, may be included in a geared turbine engine where a gear train connects one or more shafts to one or more rotors in a fan section, a compressor section and/or any other engine section. Alternatively, the rotational equipment assembly 20 may be included in a turbine engine configured without a gear train. The rotational equipment assembly 20 may be included in a geared or non-geared turbine engine configured with a single spool, with two spools (e.g., see FIG. 17), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
a plurality of seal shoes arranged circumferentially around an axial centerline in an annular array, the plurality of seal shoes comprising a first seal shoe, and the first seal shoe comprising a first seal shoe base and a first seal shoe rib that projects axially out from the first seal shoe base to an axial distal end of the first seal shoe rib;
a seal base extending circumferentially around the axial centerline;

a plurality of spring elements comprising a first spring element, the first spring element connecting and extending between the first seal shoe and the seal base; and a secondary seal assembly configured to seal a gap between the seal base and the plurality of seal shoes, the secondary seal assembly comprising a free floating seal plate that axially contacts and is configured to slide radially along the first seal shoe rib.

2. The assembly of claim 1, wherein the free floating seal plate comprises a split ring seal element.

3. The assembly of claim 1, wherein the free floating seal plate comprises a monolithic, unitary body that extends at least substantially around the axial centerline.

4. The assembly of claim 1, wherein the free floating seal plate comprises a first free floating seal plate, and the secondary seal assembly further includes a second free floating seal plate stacked axially with the first free floating seal plate.

5. The assembly of claim 1, wherein
the secondary seal assembly further includes a ring structure configured with an annular channel; and
the free floating seal plate projects, in a radially outward direction, into the annular channel and is configured to freely float within the annular channel.

6. The assembly of claim 1, wherein the free floating seal plate is not constrained by any fasteners.

7. The assembly of claim 1, wherein the free floating seal plate is not constrained by any spring elements.

8. The assembly of claim 1, wherein
the free floating seal plate has an axial thickness and a radial height; and
a ratio of the radial height to the axial thickness is between 400:1 to 4000:1.

9. The assembly of claim 1, wherein
the secondary seal assembly further includes a support ring configured with a support ring base and a support ring rib that projects axially out from the support ring base to an axial distal end of the support ring rib; and
the free floating seal plate axially contacts and is configured to slide radially along the support ring rib.

10. The assembly of claim 9, wherein
the secondary seal assembly further includes a retention ring;
the support ring is axially between the seal base and the retention ring; and
the free floating seal plate is captured axially by and between the support ring and the retention ring.

11. The assembly of claim 9, wherein
the first seal shoe rib comprises an arcuate rib; and
the support ring rib comprises an annular rib.

12. The assembly of claim 1, wherein
the first seal shoe rib is configured with a crowned surface at the axial distal end of the first seal shoe rib; and
the free floating seal plate axially contacts and is configured to slide radially along the crowned surface.

13. The assembly of claim 12, wherein the crowned surface has a curved sectional geometry.

14. The assembly of claim 12, wherein the crowned surface has a pointed sectional geometry.

15. The assembly of claim 12, wherein
the first seal shoe rib is configured with a flat planar surface at the axial distal end of the first seal shoe rib; and
the free floating seal plate axially contacts and is configured to slide radially along the flat planar surface.

16. The assembly of claim 1, wherein
a channel projects axially into the first seal shoe; and
the channel is located radially inboard of and radially bounded by the first seal shoe rib.

17. An assembly for rotational equipment, comprising:
a plurality of seal shoes arranged circumferentially around an axial centerline in an annular array, the plurality of seal shoes comprising a first seal shoe;
a stationary support structure extending circumferentially around the axial centerline, the stationary support structure comprising a base and a rib that projects axially out from the base to an axial distal end of the rib;
a plurality of spring elements comprising a first spring element, the first spring element connecting and extending between the first seal shoe and the stationary support structure; and
a free floating seal plate configured to seal a gap between the stationary support structure and the plurality of seal shoes, the free floating seal plate axially contacting and configured to slide radially along the rib.

18. The assembly of claim 17, wherein
the stationary support structure comprises a seal base and a support ring abutted axially against the seal base;
the seal base extends circumferentially around the plurality of seal shoes; and
the support ring comprises the base and the rib.

19. The assembly of claim 17, wherein
the first seal shoe comprises a first seal shoe base and a first seal shoe rib that projects axially out from the first seal shoe base to an axial distal end of the first seal shoe rib; and
the free floating seal plate axially contacts and is configured to slide radially along the first seal shoe rib.

20. An assembly for rotational equipment, comprising:
a plurality of seal shoes arranged circumferentially around an axial centerline in an annular array, the plurality of seal shoes comprising a first seal shoe;
a stationary support structure extending circumferentially around the plurality of seal shoes;
a plurality of spring elements comprising a first spring element, the first spring element connecting and extending between the first seal shoe and the stationary support structure; and
a seal plate configured to seal a gap between the stationary support structure and the plurality of seal shoes, the seal plate configured with an annular seal plate rib configured to axially contact and slide radially along one of the first seal shoe and the stationary support structure.

* * * * *